Figure 1:
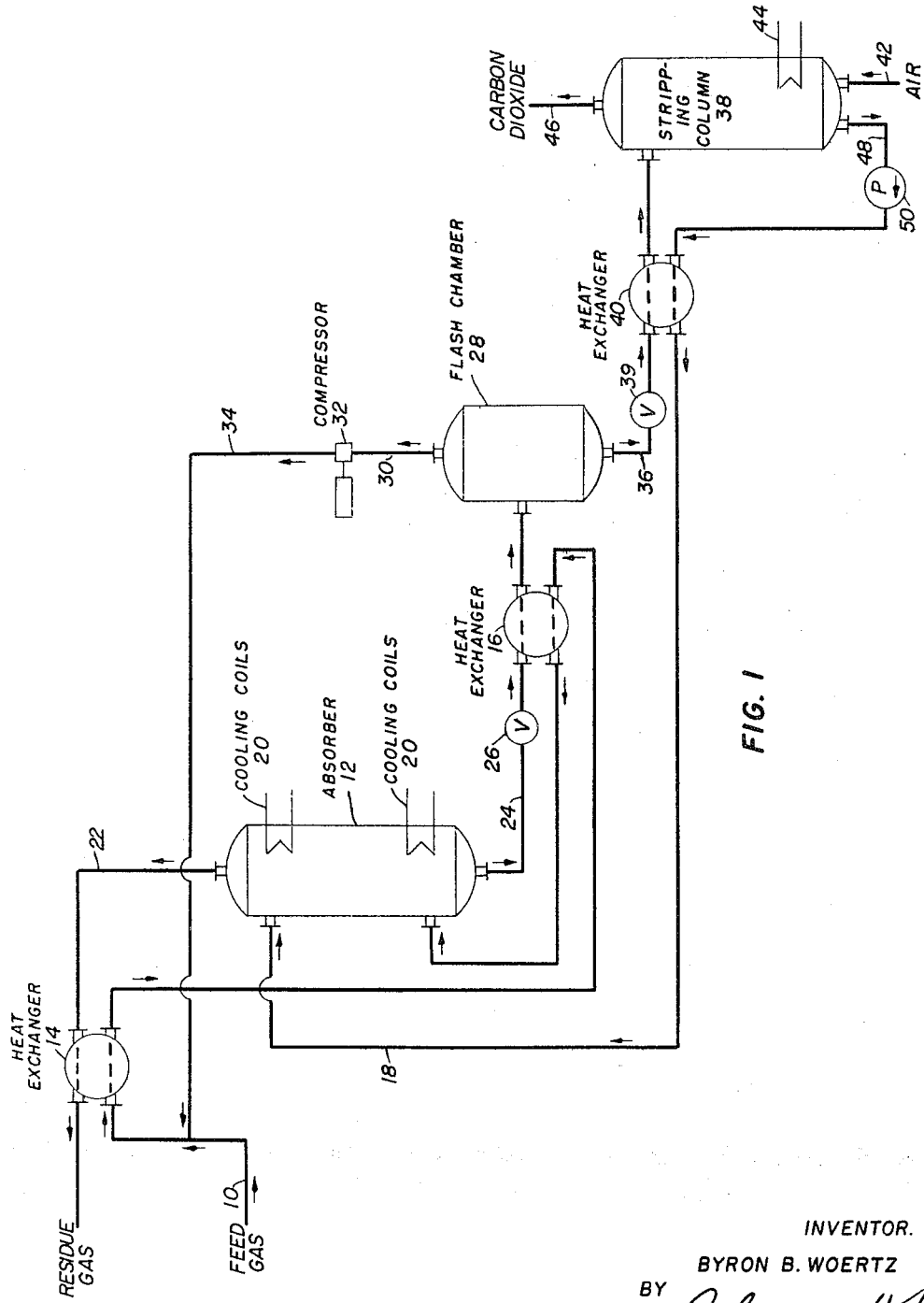

INVENTOR.
BYRON B. WOERTZ
ATTORNEY.

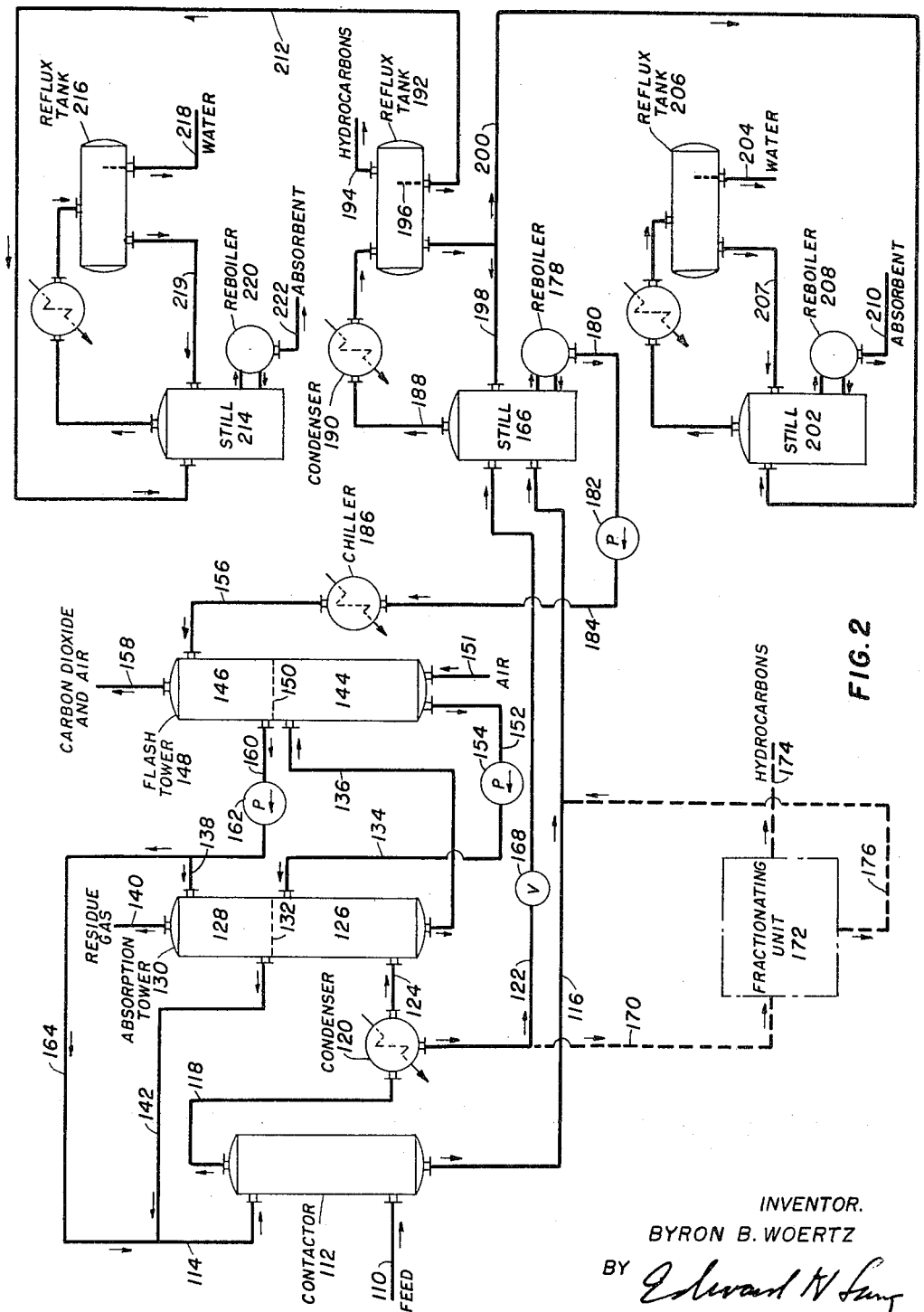

3,242,640
REMOVAL OF ACID CONSTITUENTS FROM
GAS MIXTURES
Byron B. Woertz, Crystal Lake, Ill., assignor, by mesne
assignments, to Union Oil Company of California, Los
Angeles, Calif., a corporation of California
Filed Dec. 27, 1962, Ser. No. 247,691
12 Claims. (Cl. 55—31)

This invention relates to a selective solvent for removing acid gases from admixtures with non-acidic constituents, and more particularly, to an improved process for the removal of carbon dioxide from a gaseous mixture of hydrocarbons and/or other non-acidic constituents containing carbon dioxide by the use of a selective solvent consisting essentially of at least one low-molecular-weight cyano-substituted ester.

The acid gas content of natural gases varies between broad limits, depending on the field from which it was produced. Natural gases produced from some subterranean reservoirs contain undesirably high concentrations of acid gases, such as carbon dioxide and hydrogen sulfide. Before these gases can be sold, it is necessary that the high concentration of acid gases be removed or at least reduced to an acceptable concentration. Various methods of removing acid gases from natural gas have been proposed. The removal of hydrogen sulfide has been accomplished by several acceptable commercial methods, but the removal of carbon dioxide remains a problem in the art.

Since carbon dioxide is chemically reactive while the hydrocarbon gases are relatively inert, one approach taken in attempting to solve the problem of removing carbon dioxide from mixtures containing the same is the use of solvents which react with carbon dioxide to remove it in chemically combined form. For example, (1) hot potassium carbonate and (2) mono- or diethanolamine have been proposed for removing carbon dioxide from natural gas. However, in order for any separation process to be practical, it must be possible to regenerate and recycle the solvent. It is apparent that regeneration of the chemically reactive solvents is expensive, and processes based on them are especially expensive when high concentrations of $CO_2$ are involved.

It has also been proposed to remove carbon dioxide from gaseous mixtures by the utilization of solvents which have a selective solubility for carbon dioxide. Selective solvents currently used commercially in carbon dioxide removal processes are water, methyl alcohol, acetone and propylene carbonate. The selectivity of water for carbon dioxide is excellent, but its capacity is very low, thereby requiring high circulation rates and large tower sizes in the water-wash process. At ambient temperature, the capacities of methyl alcohol and acetone are high but their selectivities are very poor. Propylene carbonate extraction is the most economical method of removing large concentrations of carbon dioxide from high pressure methane since its capacity for carbon dioxide is high and its selectivity for extracting carbon dioxide from methane is excellent. However, its selectivity decreases rapidly as the molecular weights of the hydrocarbons in the gaseous mixture increase. In removing carbon dioxide from rich gases, the propylene carbonate process would result in prohibitive loss of ethane and heavier hydrocarbons. Inasmuch as the propylene carbonate process is suitable for use in only very "lean" gas, i.e., gas having a low content of ethane and higher-molecular-weight hydrocarbons, its usefulness is restricted to the removal of carbon dioxide from natural gases produced from only a small percentage of existing fields.

In accordance with this invention, I have found that a solvent consisting essentially of at least one low-molecular weight cyano-substituted ester of the formula,

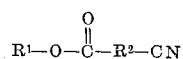

wherein $R^1$ is a lower alkyl radical and $R^2$ is a lower alkylene radical, is an effective solvent for removing carbon dioxide from gaseous mixtures containing hydrocarbons and/or other non-acidic constituents. Preferably, the cyano-substituted esters used in the selective solvents of this invention contain a maximum total of five carbon atoms in the radicals $R^1$ and $R^2$, and $R^2$ contains either one or two carbon atoms. It will be evident that the preferred cyano-substituted esters are the lower alkyl cyanoacetates and propionates. Examples of esters coming within the foregoing definition are methyl cyanoacetate, ethyl cyanoacetate, propyl cyanoacetate, isopropyl cyanoacetate, butyl cyanoacetate, methyl 2-cyanopropionate, methyl 3-cyanopropionate, ethyl 2-cyanopropionate, and isopropyl 3-cyanoproprionate. The selective solvents of this invention are also generally effective for separating hydrogen sulfide from non-acidic gases.

The selective solvents of this invention are not completely miscible with water and, therefore, will not completely dehydrate a gas. However, the solvents of the foregoing definition may be utilized in a combination process wherein a second, higher-boiling, hygroscopic solvent, such as a glycol, is used to remove moisture from the gaseous mixture as well as to recover the cyano-substituted ester which would otherwise be lost in the process.

Since at least some of the cyano-substituted esters tend to hydrolyze and become corrosive when used for treating a gaseous mixture containing appreciable moisture, it is preferred to dehydrate gases of high moisture content with a glycol or solid desiccant prior to the treatment with the absorbents of this invention.

The cyano-substituted esters may be used in the pure form for absorbing carbon dioxide or in admixture with inert solvents which serve to modify a property thereof, such as to modify their selectivity and/or capacity for absorbing carbon dioxide. The inert solvent is defined as one which is unreactive toward the esters and other solvent constituents, and the acid constitutents of the gas. In general, the cyano-substituted ester-containing solvent mixture may contain up to about 50% by volume of the inert solvent. Examples of suitable solvents with which the cyano-substituted esters may be used in admixture include propylene carbonate, ethylene carbonate, N,N'-dimethylformamide, hydracrylonitrile and nitromethane. Ethylene carbonate, having a melting point of about 95° F., is considered a liquid in this specification since mixtures of it with other solvents are usually liquid at ambient temperature, e.g., 70–80° F.

It is, therefore, a primary object of this invention to provide a process for removing acid gases from gaseous mixtures containing same. Another object of this invention is to provide a process for removing carbon dioxide from a hydrocarbon gas mixture containing same. Still another object of this invention is to provide a process for removing carbon dioxide from natural gas containing significant amounts of ethane and higher-molecular weight hydrocarbons. A further object of this invention is to provide a process for the removal of carbon dioxide from gaseous mixtures utilizing a superior selective solvent consisting essentially of at least one lowmolecular-weight cyano-substituted ester. A still further object of this invention is to provide a process for removing carbon dioxide and moisture from gaseous mixtures utilizing a combination of cyano-substituted-ester-containing solvent and a second, higher-boiling, hygroscopic solvent, the second solvent also serving to recover the cyano-substituted ester which would otherwise be lost in the process. These and further objects of this invention will become apparent and be described as the description herein proceeds and reference is made to the accompanying drawings in which:

FIGURE 1 is a diagrammatic illustration of an absorption-desorption system for carrying out the process of this invention; and FIGURE 2 is a diagrammatic illustration of an alternative embodiment of an absorption-desorption system for carrying out the process of this invention utilizing a combination of solvents, one being a low-molecular-weight, cyano-substituted ester, and the other, a higher boiling, hygroscopic solvent.

The suitability of the cyano-substituted esters coming within the foregoing definition as selective solvents for carbon dioxide has been demonstrated experimentally in a series of tests wherein the capacity of a number of solvents for carbon dioxide and propane, and the selectivity for carbon dioxide relative to propane, were determined. Solubilities were measured by injecting a measured volume of solvent into an evacuated Dumas bulb, measuring the vapor pressure of the solvent, and then metering in sufficient carbon dioxide to bring the bulb to atmospheric pressure. A series of calculations provided a corrected solubility of carbon dioxide at 80° F. The propane solubilities were similarly measured. The ratio of the carbon dioxide solubility to the propane solubility was termed the selectivity ratio. The results of this comparison are shown in Table I:

TABLE I

|  | Solvent Capacity [1] | | Selectivity Ratio $CO_2/C_3H_8$ |
| --- | --- | --- | --- |
|  | $CO_2$ | $C_3H_8$ |  |
| Methyl Cyanoacetate | 3.22 | 1.34 | 2.40 |
| Ethyl Cyanoacetate | 3.21 | 1.93 | 1.72 |
| Methyl Alcohol | 3.50 | 5.86 | 0.60 |
| Propylene Carbonate | 3.20 | 1.84 | 1.74 |
| Methyl 3-cyanopropionate | 3.51 | 1.41 | 2.49 |

[1] Solubilities determined here are the volumes of gas dissolved, measured at 1 atmosphere and 80° F., per volume of solvent measured at 80° F., when the partial pressure of dry gas above the solvent is one atmosphere.

Using methyl cyanoacetate, ethyl cyanoacetate, and methyl 3-cyanopropionate as representative of the solvents of this invention, this comparison shows that while the capacity of methyl cyanoacetate for carbon dioxide is slightly greater than that of propylene carbonate, the capacity of methyl cyanoacetate for propane is only about 73% that of propylene carbonate. Because of this difference in the capacities of methyl cyanoacetate and propylene carbonate, methyl cyanoacetate has a selectivity for extracting carbon dioxide from ethane and propane over 37% greater than that of propylene carbonate. It can similarly be seen that the capacity of ethyl cyanoacetate for carbon dioxide and propane, and the resulting selectivity of ethyl cyanoacetate for carbon dioxide, is about equal to that of propylene carbonate. The superiority of solvents consisting essentially of low-molecular weight cyano-substituted esters over other solvents will be apparent from the selectivity ratios given in the above table.

The effectiveness of methyl cyanoacetate relative to propylene carbonate was further demonstrated by experiments in which were measured the concentrations of carbon dioxide and ethane which dissolve in pure solvent at 100 p.s.i.a. gas pressure and 0° F. These values are shown in Table II:

TABLE II

|  | Mol Fraction at 100 p.s.i.a. and 0° F. | | Cu. ft. gas at 1 atm. and 0° F. dissolved in 1 cu. ft. solvent at 0° F. | | Selectivity, $CO_2/C_2H_6$ |
| --- | --- | --- | --- | --- | --- |
|  | $CO_2$ | Ethane | $CO_2$ | Ethane |  |
| Methyl Cyanoacetate | 0.230 | 0.0242 | 73.65 | 6.115 | 12.00 |
| Propylene Carbonate | 0.205 | 0.0292 | 66.90 | 7.815 | 8.59 |

In general, this invention contemplates the removal of carbon dioxide from gaseous mixtures containing same by treatment with a selective solvent consisting essentially of low-molecular-weight cyano-substituted esters of the foregoing definition. In addition to the treatment of natural gas containing carbon dioxide, the process of this invention is applicable to the treatment of any carbon dioxide-containing gaseous mixture as long as the solvent has a selectivity for extracting carbon dioxide from the gaseous mixture. For example, the solvent of this invention can be used for removing carbon dioxide from flue gas, hydrogen, or reformed gas for ammonia synthesis.

The process of this invention is carried out using conventional absorption procedures, wherein the gaseous mixture is contacted with the selective solvent of this invention in either batchwise or counter-current treatment. Successive batchwise extractions can also be used. In the preferred method of practicing the invention, the gaseous mixture to be treated is contacted in a counter-current absorption tower with the absorbent in a continuous flow method. The spent solvent is continuously withdrawn from the absorption tower and is introduced into a flash chamber and/or air-stripping column to remove the absorbed gases. Vacuum flash can be substituted for air stripping, if desired. The regenerated solvent is then recycled through the absorption tower where it is used again.

The extraction process is preferably carried out at temperatures within the range of about —20° to +100° F. although higher and lower temperatures may be utilized. It will be evident that the minimum temperature at which any specific solvent can be used is the minimum temperature at which the composition is a liquid. Pressures from about 100 to 1500 p.s.i.g. (pounds per square inch gauge) may be used. The vaporization loss of the solvent is a factor to be considered in determining the contacting conditions. The maximum contact temperature should be limited to prevent an excessive loss of the solvent. In general, the feed gas and solvent are contacted at a rate of 5 to 150 gallons of solvent per Mc.f. of gas.

This invention is best understood by reference to FIGURE 1, wherein a feed gaseous mixture such as natural gas, containing carbon dioxide which is to be removed therefrom, is fed through line 10 into the bottom of absorber 12 after it passes in indirect heat exchange with the residue gas from absorber 12 in heat exchanger 14 and rich absorbent in heat exchanger 16. The absorbent consisting essentially of methyl cyanoacetate, which is hereinafter referred to merely as the absorbent, is introduced into the top of absorber 12 through line 18. Absorber 12 can be any suitable absorption column, such as a vertically extended column, containing appropriate packing or trays to assure intimate countercurrent contact of the rising feed mixture with the downflowing absorbent, and cooling coils 20 to provide the desired degree of cooling, as illustrated in the drawing. Absorber 12 is maintained under such conditions of pressure, usually superatmospheric, and temperature that carbon dioxide is absorbed from the feed mixture. As previously indicated, the absorption process is preferably carried out at a temperature within the range of about —20° to +100°

F. and a pressure between about 100 and 1500 p.s.i.g. The amount and rate of carbon dioxide absorption increase directly with an increase in the pressure maintained in the absorption zone, in the lower pressure ranges. The feed mixture, from which at least part of the carbon dioxide content has been absorbed, is then removed from absorber 12 through line 22, passed in indirect heat exchange with the feed gas in exchanger 14, and fed to a suitable receiver or otherwise disposed.

The rich absorbent, containing absorbed carbon dioxide, is withdrawn from absorber 12 through line 24. Then, the rich absorbent undergoes a controlled pressure reduction, such as by being passed successively through expansion valve 26 and heat exchanger 16 into flash chamber 28. Flash chamber 28 is maintained at a pressure below the presure of absorption column 12, but above atmospheric pressure, e.g., about 50 to 400 p.s.i.g. so that the flash gas is about 5 to 10% of the inlet gas in line 10 at standard temperature and pressure (14.7 p.s.i.a. and 60° F.). As the absorbent undergoes pressure reduction, it becomes cooled due to the loss of heat of absorption acquired in absorber 12 and expansion of absorbed carbon dioxide to a lower partial pressure. Part of the absorbed carbon dioxide and non-acidic constituents of the feed gas are withdrawn from flash chamber 28 through line 30. The gases in line 30 are compressed in compressor 32 and passed through a line 34 to be mixed with the feed gas before it passes through exchanger 14. The partially desorbed absorbent is withdrawn from flash chamber 28 through line 36 and fed into stripping column 38 after it has passed successively through expansion valve 39 and exchanger 40, in indirect heat exchange with the lean absorbent withdrawn from column 38.

Air or other inert stripping gas is introduced into stripping column 38 through line 42. Stripping column 38 is provided with heating coil 44 to apply heat if necessary. In stripping column 38, substantially all of the remaining absorbed carbon dioxide is removed from the absorbent and withdrawn through line 46 to be disposed of as desired. Line 46 may be provided with a vacuum pump, if desired. The resulting lean absorbent is then withdrawn from stripping column 38 through line 48, where it is forced by pump 50 through heat exchanger 40 and then returned to absorber 12 through line 18. It will be evident that line 18 may include a second heat exchanger, not shown, to further cool the lean absorbent after it has passed through heat exchanger 40.

Other alternative absorption-desorption processes will be apparent to those skilled in the art. For example if it is not desired to limit the loss of the non-acidic constituents of the feed gas, the rich absorbent may be desorbed in a flash or stripping step and the off-gases disposed of as desired. The partially desorbed absorbent may then be recycled to the absorber or introduced into a stripping column to remove the last vestages of absorbed carbon dioxide before it is recycled to the absorption column. The residue gas from the absorber and/or the flash gas may be passed through a solid bed of an adsorbent, such as silica gel, activated alumina, activated carbon or a synthetic zeolite, to separate vaporized absorbent therefrom.

In an alternative embodiment of this invention, the absorbent of this invention may be used in combination with a second higher boiling hygroscopic solvent which is absorptive of it, to avoid the uneconomically high solvent losses which are common in conventional processes. The hydroscopic solvent serves to remove moisture from the feed gaseous mixture, as well as to recover the absorbent which would otherwise be lost in the product gas stream. The hygroscopic solvent is any of the polyhydric alcohols or glycols which have been proposed or used for moisture extraction, such as ethylene glycol, propylene glycol, diethylene glycol, triethylene glycol and aqueous solutions thereof.

This alternative embodiment is best understood by reference to FIGURE 2, wherein the numeral 110 represents the line through which the gas is to be treataed. For example, a nataural gas consisting of hydrocarbons, carbon dioxide, and moisture, is fed into the bottom of contactor 112, in which it is countercurrently contacted with a mixture of the methyl cyanoacetate and hygroscopic solvents entering through line 114. Contactor 112, which may contain any suitable type and arrangement of trays or baffles as required for intimacy of contact between the absorbent mixture and feed gas, is preferably maintained at a temperature within the range of about 0° to 100° F. and a pressure within the range of about 100 to 1500 p.s.i.g., although higher and lower temperatures and pressures may be used. A suitable example of the single phase absorbent mixture entering contactor 112 through line 114 is 75–95 weight percent of a glycol, such as diethylene or triethylene glycol, 0–5 weight percent of a cyano-substituted ester, such as methyl cyanoacetate, and 0–20 weight percent of water. Since methyl cyanoacetate is not completely water miscible, the water content of the glycol is subject to limits if the glycol is to absorb the absorbents of this invention. In contactor 112, a small part of the methyl cyanoacetate content of the solvent mixture may vaporize, and much of the water content of the feed gas stream is taken up by the glycol solvent. Glycol absorbent, containing water and some methyl cyanoacetate absorbent, is withdrawn from contactor 112 through line 116. The resulting natural gas, containing some methyl cyanoacetate, leaves contactor 112 through line 118, and flows to chiller-condenser 120, in which its temperature is reduced to absorption temperature, for example, −20° to 50° F. Condensed hydrocarbons, methyl cyanoacetate and/or water are withdrawn from chiller-condenser 120 through line 122.

The chilled, uncondensed components of the natural gas-methyl cyanoacetate absorbent mixture pass from chiller-condenser 120 through line 124 to the absorbing zone which, as illustrated, may be contained within the lower and upper sections 126 and 128 of a single vertically extended absorption tower 130, the two sections being separated by liquid trap-out tray 132. Absorber 130 can have any suitable arrangement of packing or trays to assure intimate countercurrent contact of the rising feed mixture with the down-flowing absorbent. In section 126, the gas is countercurrently contacted with methyl cyanoacetate absorbent entering through line 134, which removes at least part of the acid gas constituents. Rich methyl cyanoacetate, containing absorbed carbon dioxide, is withdrawn from absorption tower 130 through line 136. The scrubbed natural gas passes on upward in tower 130 past trap-out tray 132 into upper section 128, where it is counter-currently contacted with the glycol absorbent entering through line 138. The diethylene glycol absorbent scrubs any vaporized methyl cyanoacetate absorbent and water from the natural gas and the scrubbed natural gas product of reduced carbon dioxide content is withdrawn through line 140 to a suitable receiver or other disposition. The mixture of glycol and methyl cyanoacetate absorbents from upper section 128 is trapped on tray 132, and is withdrawn through line 142 and itnroduced into contactor 112 through line 114.

The methyl cyanoacetate absorbent in line 136 enters a combined flashing and contacting zone which, as illustrated, may be lower flashing zone 144 and upper contacting zone 146 in a single vertically extended flash tower 148, with the upper and lower sections being separated by liquid trap-out tray 150. The rich methyl cyanoacetate absorbent enters flash zone 144, which is maintained at a pressure below the absorption column pressure and usually at about atmospheric pressure, where it undergoes pressure reduction to flash-off absorbed carbon dioxide. If desired, air or other inert stripping gas is introduced into zone 144 through line 151. The lean methyl cyanoacetate absorbent is withdrawn from flash zone 144 through line 152 and is introduced back to absorption tower 130 by pump 154 through line 134. Carbon dioxide and stripping gas containing entrained and vaporized methyl cyanoacetate absorbent leaves flash zone 144, and it passes through trap-out tray 150 into contacting zone 146 where it is counter-currently contacted with diethylene glycol solvent entering through line 156. The diethylene glycol scrubs any vaporized methyl cyanoacetate absorbent from the carbon dioxide, and the carbon dioxide and stripping gas are withdrawn through line 158 to be disposed of as desired. This carbon dioxide is suitable for use in miscibly flooding oil reservoirs, if stripping gas contamination is low.

The resulting mixture of the diethylene glycol and methyl cyanoacetate absorbents from contacting zone 146 of vessel 148 is trapped on tray 150 and withdrawn through line 160. Part of the solvent mixture in line 160 is passed by pump 162 to branch line 138 from where it is introduced into upper section 128 of contactor 130. The remainder of the solvent in line 160 is passed through line 164 and combined with the solvent mixture in line 142 to form the mixture entering contactor 112 through line 114.

The glycol absorbent, containing water and methyl cyanoacetate, in line 116 and the condensate in line 122 are introduced into glycol still 166, with the condensate in line 122 being introduced into still 166 at a point higher than that where the liquid in line 116 is introduced. Alternatively, with valve 168 closed, condensate in line 122 is passed through line 170 into fractionating unit 172 where hydrocarbons are recovered from the condensate. The hydrocarbons are removed through line 174 and the remaining glycol and methyl cyanoacetate are withdrawn through line 176 and mixed with the liquid in line 116.

Glycol still 166 is equipped with reboiler 178 from which regenerated diethylene glycol is withdrawn through line 180 and forced by pump 182 successively through line 184, chiller 186, and line 156 to contacting zone 146 of vessel 148. Overhead from still 166, comprising methyl cyanoacetate absorbent, water, and hydrocarbons, is passed through line 188 and condenser 190 into reflux tank 192. Non-condensable hydrocarbon gases are vented from reflux tank 192 by line 194. Since the methyl cyanoacetate absorbent is heavier than water and not completely water miscible, it is separated from the water in reflux tank 192 by providing reflux tank with short standpipe 196 through which the lighter water layer is withdrawn. The heavier methyl cyanoacetate absorbent layer is withdrawn from reflux tank 192 and part of it is returned to still 166, as reflux, through 198 and the remaining portion is passed through line 200 into methyl cyanoacetate still 202. Water, which is carried overhead from still 202 with some methyl cyanoacetate, is removed from reflux tank 206 through line 204 and either discarded or combined with the water withdrawn through standpipe 196. Methyl cyanoacetate carried overhead from still 202 with the water, and separated therefrom in reflux tank 206, is returned to still 202 through line 207. Substantially dry methyl cyanoacetate absorbent is removed from reboiler 208 through line 210 and returned to the system.

The water separated from the methyl cyanoacetate in reflux tank 192 by standpipe 196 is passed through line 212 into water still 214. Water, which is carried overhead from still 214 with some methyl cyanoacetate, is removed from reflux tank 216 through line 218 and discarded, while the heavier methyl cyanoacetate is returned to still 214 from reflux tank 216 through line 219. As hereinbefore pointed out, the water removed from reflux tank 206 may be combined with the water in line 212 before it is introduced into still 214. Purified methyl cyanoacetate is recovered from reboiler 220 through line 222, after which it is returned to the system. It is preferred that stills 166, 202 and 214 operate under vacuum to reduce the temperature to which methyl cyanoacetate is exposed, as some decomposition can occur at the atmospheric boiling point.

Water still 214 can be operated so that a water-methyl cyanoacetate mixture can be removed from reboiler 220 which will separate into water rich and solvent rich phases upon cooling. The methyl cyanoacetate-rich phase can be transferred to line 200 and the water-rich phase to line 212.

Since a small amount of water in the methyl cyanoacetate absorbent is not especially detrimental to its effectiveness in absorbing carbon dioxide, methyl cyanoacetate still 202 may not be required in many instances. In any case, glycol still 166, methyl cyanoacetate still 202 and water still 214 need be only relatively small units.

The following specific examples will serve more particularly to point out the instant invention.

*Example I*

Tables III and IV are illustrative of the process streams of the process depicted in FIGURE 1 wherein a natural gas mixture is contacted in absorber 12, containing 10 theoretical trays and maintained at 600 p.s.i.a. and 0° F., with the lean absorbent. One hundred mols of the natural gas per unit time are contacted in different runs with methyl cyanoacetate and propylene carbonate in such amounts that the residue gas contains about 2 volume percent of carbon dioxide. The rich absorbent withdrawn from absorber 12 is flashed isothermally at 0° F. in flash chamber 28 at such pressure that recycled flash gas is about 5 to 10% of the feed gas. The pressure of the partially desorbed absorbent withdrawn from flash chamber 28 is reduced to atmospheric pressure in stripping column 38. Table III gives the compositions of the process streams where the gas is contacted with the methyl cyanoacetate and, for the purpose of comparison, Table IV gives the composition of the process streams wherein the gas is contacted with the propylene carbonate.

The required solvent circulation is 22.89 gallons of methyl cyanoacetate per Mc.f. of inlet gas as compared to 26.22 gal./Mc.f. when using propylene carbonate (gas and solvent volumes measured at 14.7 p.s.i.a. and 60° F.). In addition, residue gas yield per 10 mols of inlet gas is 81.26 when methyl cyanoacetate is used and 80.10 when propylene carbonate is used.

TABLE III

CARBON DIOXIDE ABSORPTION PROCESS USING METHYL CYANOACETATE

| Components | Mols of Inlet Gas (Line 10) | Mols of Solvent (Line 18) | Residue Gas (Line 22) | | Mols of Rich Solvent (Line 24) | 200 p.s.i.a. Flash Gas (Line 30) | | Atmos. Strip Gas (Line 46) | | Percent Loss |
|---|---|---|---|---|---|---|---|---|---|---|
| | | | Mols | Mol Percent | | Mols | Mol Percent | Mols | Mol Percent | |
| Methane | 72.00 | | 71.70 | 88.24 | 1.56 | 1.26 | 38.3 | 0.30 | 1.6 | 0.42 |
| Ethane | 6.00 | | 5.69 | 7.00 | 0.58 | 0.27 | 8.2 | 0.31 | 1.6 | 5.2 |
| Propane | 2.00 | | 1.65 | 2.03 | 0.46 | 0.11 | 3.4 | 0.35 | 1.9 | 17.5 |
| Carbon Dioxide | 19.00 | | 1.61 | 1.98 | 18.99 | 1.60 | 48.6 | 17.39 | 92.8 | 91.5 |
| n-Butane | 1.00 | | 0.61 | 0.75 | 0.44 | 0.05 | 1.5 | 0.39 | 2.1 | 39.0 |
| Methyl cyanoacetate | | 82.88 | 0 | 0 | 82.88 | 0 | 0 | 0 | 0 | |
| Total | 100.00 | 82.88 | 81.26 | 100.00 | 104.91 | 3.29 | 100.0 | 18.74 | 100.0 | |

TABLE IV
CARBON DIOXIDE ABSORPTION PROCESS USING PROPLENE CARBONATE

| Components | Mols of Inlet Gas (Line 10) | Mols of Solvent (Line 18) | Residue Gas (Line 22) | | Mols of Rich Solvent (Line 24) | 200 p.s.i.a. Flash Gas (Line 30) | | Atmos. Strip Gas (Line 46) | | Percent Loss |
|---|---|---|---|---|---|---|---|---|---|---|
| | | | Mols | Mol Percent | | Mols | Mol Percent | Mols | Mol Percent | |
| Methane | 72.00 | | 71.56 | 89.34 | 2.53 | 2.09 | 41.8 | 0.44 | 2.21 | 0.61 |
| Ethane | 6.00 | | 5.46 | 6.81 | 0.99 | 0.45 | 9.0 | 0.54 | 2.71 | 9.0 |
| Propane | 2.00 | | 1.33 | 1.66 | 0.87 | 0.20 | 4.0 | 0.67 | 3.37 | 33.5 |
| Carbon Dioxide | 19.00 | | 1.60 | 2.00 | 19.56 | 2.16 | 43.2 | 17.40 | 87.44 | 91.6 |
| n-Butane | 1.00 | | 0.15 | 0.19 | 0.95 | 0.10 | 2.0 | 0.85 | 4.27 | 85.0 |
| Propylene Carbonate | 0 | 98.43 | 0 | 0 | 98.43 | 0 | 0 | 0 | 0 | |
| Total | 100.00 | 98.43 | 80.10 | 100.00 | 123.33 | 5.00 | 100.0 | 19.90 | 100.00 | |

Example II

Table V is also illustrative of the process streams of the process depicted in FIGURE 1 wherein the natural gas mixture of Example I is contacted with ethyl cyanoacetate in absorber 12, described in Example I. One hundred mols of the natural gas per unit time are contacted with the absorbent in such an amount that the residue gas contains about 2 volume percent of carbon dioxide. The rich absorbent withdrawn from absorber 12 is flashed isothermally at 0° F. in flash chamber 28 at such pressure that recycled flash gas is about 5 to 10% of the feed gas. The pressure of the partially desorbed absorbent withdrawn from flash chamber 28 is reduced to atmospheric pressure in stripping column 38. Table V gives the compositions and amounts of the process streams when the gas is contacted with 27.6 gallons of ethyl cyanoacetate per Mc.f. of inlet gas. The gas and solvent volumes are measured at 14.7 p.s.i.a. and 60° F.

TABLE V
CARBON DIOXIDE ABSORPTION PROCESS USING ETHYL CYANOACETATE

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | | Percent Loss |
|---|---|---|---|---|---|---|---|---|---|---|
| | | | Mols | Mol Percent | | Mols | Mol Percent | Mols | Mol Percent | |
| Methane | 72.0 | | 71.37 | 90.19 | 2.81 | 2.18 | 46.4 | 0.63 | 3.0 | 0.88 |
| Ethane | 6.0 | | 5.19 | 6.56 | 1.27 | 0.46 | 9.8 | 0.81 | 3.9 | 13.5 |
| Propane | 2.0 | | 0.98 | 1.24 | 1.21 | 0.19 | 4.0 | 1.02 | 4.9 | 51.0 |
| Carbon Dioxide | 19.0 | | 1.58 | 2.00 | 19.22 | 1.80 | 38.3 | 17.42 | 83.5 | 91.7 |
| n-Butane | 1.0 | | 0.01 | 0.01 | 1.06 | 0.07 | 1.5 | 0.99 | 4.7 | 99.0 |
| Ethyl Cyanoacetate | 0 | 82.37 | 0 | 0 | 82.37 | 0 | 0 | 0 | 0 | |
| Total | 100.0 | 82.37 | 79.13 | 100.00 | 107.94 | 4.70 | 100.0 | 20.87 | 100.0 | |

Example III

Tables VI and VII depict the compositions of process streams where the natural gas mixture of Example I is contacted with solvents under the conditions described in Example I except the absorber is maintained at 70° F. Table VI gives the compositions of the process streams when the gas feed is contacted with 63.5 gallons of methyl 3-cyanopropionate per Mc.f., while for comparison, Table VII gives the compositions when the gas feed is contacted with propylene carbonate in an amount of 66.9 gallons per Mc.f.

TABLE VI
CARBON DIOXIDE ABSORPTION PROCESS USING METHYL 3-CYANOPROPIONATE

| Components | Mols of Inlet Gas (Line 10) | Mols of Solvent (Line 18) | Residue Gas (Line 22) | | Mols of Rich Solvent (Line 24) | 200 p.s.i.a. Flash Gas (Line 30) | | Atmos. Strip Gas (Line 46) | | Percent Loss |
|---|---|---|---|---|---|---|---|---|---|---|
| | | | Mols | Mol Percent | | Mols | Mol Percent | Mols | Mol Percent | |
| Methane | 72.00 | | 70.90 | 89.71 | 5.06 | 3.96 | 47.0 | 1.10 | 5.2 | 1.5 |
| Ethane | 6.00 | | 5.22 | 6.16 | 1.50 | 0.72 | 8.5 | 0.78 | 3.7 | 13.0 |
| Propane | 2.00 | | 1.21 | 1.53 | 1.09 | 0.30 | 3.6 | 0.79 | 3.8 | 39.5 |
| Carbon Dioxide | 19.00 | | 1.57 | 1.99 | 20.72 | 3.29 | 39.1 | 17.43 | 83.1 | 91.7 |
| n-Butane | 1.00 | | 0.13 | 0.16 | 1.02 | 0.15 | 1.8 | 0.87 | 4.2 | 87.0 |
| Methyl 3-cyanopropionate | 0 | 193.46 | 0 | 0 | 193.46 | 0 | 0 | 0 | 0 | |
| Total | 100.00 | 193.46 | 79.03 | 100.00 | 222.85 | 8.42 | 100.0 | 20.97 | 100.0 | |

TABLE VII

CARBON DIOXIDE ABSORPTION PROCESS USING PROPYLENE CARBONATE

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | | Percent Loss |
|---|---|---|---|---|---|---|---|---|---|---|
| | | | Mols | Mol Percent | | Mols | Mol Percent | Mols | Mol Percent | |
| Methane | 72.00 | | 71.33 | 89.69 | 4.92 | 4.25 | 33.3 | 0.67 | 3.3 | 0.93 |
| Ethane | 6.00 | | 5.36 | 6.74 | 1.63 | 0.99 | 7.8 | 0.64 | 3.1 | 10.7 |
| Propane | 2.00 | | 1.19 | 1.49 | 1.32 | 0.51 | 4.0 | 0.81 | 4.0 | 40.5 |
| Carbon Dioxide | 19.00 | | 1.59 | 2.00 | 24.15 | 6.74 | 52.8 | 17.41 | 85.0 | 91.7 |
| n-Butane | 1.00 | | 0.06 | 0.08 | 1.21 | 0.27 | 2.1 | 0.94 | 4.6 | 93.0 |
| Propylene Carbonate | 0 | 253.24 | 0 | 0 | 253.24 | 0 | 0 | 0 | 0 | |
| Total | 100.00 | 253.24 | 79.53 | 100.00 | 286.47 | 12.76 | 100.0 | 20.47 | 100.00 | |

*Example IV*

In order to demonstrate the effectiveness of the solvents of this invention in removing both carbon dioxide and hydrogen sulfide from a gaseous mixture containing same and non-acidic components, Table VIII is illustrative of the process streams wherein a natural gas containing both carbon dioxide and hydrogen sulfide is treated in the process depicted in FIGURE 1. In this example, the natural gas is contacted in absorber 12, containing ten theoretical trays and maintained at 600 p.s.i.a. and 0° F., with the lean methyl cyanoacetate absorbent. The solvent circulation is adjusted to 22.61 gallons of methyl cyanoacetate per Mc.f. of feed gas to limit the amount of carbon dioxide in the residue gas to about 1.5 mol percent. From an inspection of Table VIII it can be seen that the solvents of this invention are effective selective solvents for hydrogen sulfide as well as carbon dioxide.

tacted with the solvent blend in such an amount that the residue gas contains about 2 volume percent of carbon dioxide. The rich absorbent withdrawn from absorber 12 is flashed isothermally at 40° F. in flash chamber 28 at such pressure that recycled flash gas is about 5 to 10% of the feed gas. The pressure of the partially desorbed absorbent withdrawn from flash chamber 28 is reduced to atmospheric pressure in stripping column 38. Table IX gives the compositions and amounts of the process streams when the gas is contacted with 50.0 gallons of the 75 volume percent methyl cyanoacetate-25 volume percent ethylene carbonate absorbent per Mc.f. of inlet gas. Gas and solvent volumes are measured at 14.7 p.s.i.a. and 60° F.

Table X gives data comparable to that in Table IX for a process in which the gas stream is contacted at 600 p.s.i.a. and 40° F. with 49.9 gallons of methyl cyanoacetate per Mc.f. of inlet gas. A 10 theoretical tray absorber is also used in the Table X example. Whereas solvent circulation rates are almost identical in Tables IX and X, the tables show that use of ethylene carbonate blended with methyl cyanoacetate results in lower hydrocarbon solubilities (increased selectivity). Because of the relatively high freezing point of ethylene carbonate, difficulty would likely result in attempts to operate at 0° F. with this blend.

TABLE VIII

CARBON DIOXIDE ABSORPTION PROCESS USING METHYL CYANOACETATE

| Components | Mols of Inlet Gas (Line 10) | Mols of Solvent (Line 18) | Residue Gas (Line 22) | | Mols of Rich Solvent (Line 24) | 200 p.s.i.a. Flash Gas (Line 30) | | Atmos. Strip Gas (Line 46) | | Percent Loss |
|---|---|---|---|---|---|---|---|---|---|---|
| | | | Mols | Mol Percent | | Mols | Mol Percent | Mols | Mol Percent | |
| Methane | 72.00 | | 71.66 | 88.71 | 1.55 | 1.21 | 44.3 | 0.34 | 1.8 | 0.47 |
| Ethane | 6.00 | | 5.67 | 7.02 | 0.57 | 0.24 | 8.8 | 0.33 | 1.7 | 5.5 |
| Propane | 2.00 | | 1.64 | 2.03 | 0.46 | 0.10 | 3.7 | 0.36 | 1.9 | 18.0 |
| Carbon Dioxide | 14.00 | | 1.20 | 1.49 | 19.78 | 0.98 | 35.9 | 12.80 | 66.6 | 91.4 |
| Hydrogen Sulfide | 5.00 | | 0 | 0 | 5.16 | 0.16 | 5.8 | 5.00 | 26.0 | 100.0 |
| n-Butane | 1.00 | | 0.61 | 0.75 | 0.43 | 0.04 | 1.5 | 0.39 | 2.0 | 39.0 |
| Methyl cyanoacetate | 0 | 81.87 | 0 | 0 | 81.87 | 0 | 0 | 0 | 0 | |
| Total | 100.00 | 81.87 | 80.78 | 100.00 | 109.82 | 2.73 | 100.0 | 19.22 | 100.00 | |

*Example V*

Table IX is illustrative of the process depicted in FIGURE 1 wherein a natural gas mixture is contacted in absorber 12, containing 10 theoretical trays and maintained at 600 p.s.i.a. and 40° F., with a lean absorbent consisting of 75 volume percent methyl cyanoacetate blended with 25 volume percent ethylene carbonate. One hundred mols of the natural gas per unit time are con-

TABLE IX

CARBON DIOXIDE ABSORPTION PROCESS USING 25 VOL. PERCENT ETHYLENE CARBONATE BLENDED WITH 75 VOL. PERCENT METHYL CYANOACETATE

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | | Percent Loss |
|---|---|---|---|---|---|---|---|---|---|---|
| | | | Mols | Mol Percent | | Mols | Mol Percent | Mols | Mol Percent | |
| Methane | 72.0 | | 71.65 | 88.42 | 2.84 | 2.49 | 35.1 | 0.35 | 1.8 | 0.49 |
| Ethane | 6.0 | | 5.67 | 7.00 | 0.86 | 0.53 | 7.5 | 0.33 | 1.7 | 5.5 |
| Propane | 2.0 | | 1.61 | 1.99 | 0.64 | 0.25 | 3.5 | 0.39 | 2.1 | 19.5 |
| Carbon Dioxide | 19.0 | | 1.63 | 2.01 | 21.05 | 3.68 | 91.8 | 17.37 | 91.6 | 91.4 |
| n-Butane | 1.0 | | 0.47 | 0.58 | 0.68 | 0.15 | 2.1 | 0.53 | 2.8 | 53.0 |
| Solvent [1] | 0 | 196.29 | 0 | | 196.29 | 0 | 0 | 0 | 0 | |
| Total | 100.0 | 196.29 | 81.03 | 100.00 | 222.36 | 7.10 | 100.0 | 18.97 | 100.0 | |

[1] 75 Vol. percent methyl cyanoacetate. 25 Vol. percent ethylene carbonate.

TABLE X
CARBON DIOXIDE ABSORPTION PROCESS USING METHYL CYANOACETATE

| Components | Mols of Inlet Gas (Line 10) | Mols of Solvent (Line 18) | Residue Gas (Line 22) | | Mols of Rich Solvent (Line 24) | 150 p.s.i.a. Flash Gas (Line 30) | | Atmos. Strip Gas (Line 46) | | Percent Loss |
|---|---|---|---|---|---|---|---|---|---|---|
| | | | Mols | Mol Percent | | Mols | Mol Percent | Mols | Mol Percent | |
| Methane | 72.0 | | 71.51 | 88.57 | 3.28 | 2.79 | 41.3 | 0.49 | 2.6 | 0.68 |
| Ethane | 6.0 | | 5.59 | 6.92 | 0.95 | 0.54 | 8.0 | 0.41 | 2.1 | 6.8 |
| Propane | 2.0 | | 1.56 | 1.93 | 0.67 | 0.23 | 3.4 | 0.44 | 2.3 | 22.0 |
| Carbon Dioxide | 19.0 | | 1.62 | 2.01 | 20.45 | 3.07 | 45.5 | 17.38 | 90.2 | 91.5 |
| n-Butane | 1.0 | | 0.46 | 0.57 | 0.66 | 0.12 | 1.8 | 0.54 | 2.8 | 54.0 |
| Methyl cyanoacetate | 0 | 180.54 | 0 | 0 | 180.54 | 0 | 0 | 0 | | |
| Total | 100.0 | 180.54 | 80.74 | 100.00 | 206.55 | 6.75 | 100.0 | 19.26 | 100.0 | |

The embodiments of the invention in which an exclusive property or privilege is claimed are defined as follows:

1. A process of removing gaseous acid gas selected from the group consisting of carbon dioxide and hydrogen sulfide from admixture with gaseous $C_1$–$C_3$ alkane hydrocarbons which comprises contacting said gaseous admixture with a solvent consisting essentially of at least one low-molecular-weight cyano-substituted ester of the formula

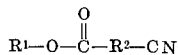

wherein $R^1$ is a lower alkyl radical and $R^2$ is a lower alkylene radical, under conditions resulting in selective absorption of said acid gas, and separating the unabsorbed components of said gaseous admixture from said solvent.

2. A process according to claim 1 in which the radicals $R^1$ and $R^2$ contain a maximum total of five carbon atoms, and the radical $R^2$ contains a maximum of two carbon atoms.

3. A process according to claim 2 in which said solvent is methyl 3-cyanopropionate.

4. A process according to claim 2 in which said solvent is methyl cyanoacetate.

5. A process according to claim 2 in which said solvent is ethyl cyanoacetate.

6. A process according to claim 2 in which said acid gas is carbon dioxide.

7. A process according to claim 2 in which said gaseous admixture is passed through an absorption zone at superatmospheric pressure in countercurrent contact with said solvent, a stream of rich solvent is removed from said absorption zone and the pressure thereof is reduced to flash off acid gas and at least part of the residual acid gas is removed from said solvent stream following said pressure reduction by air stripping of said solvent stream.

8. A process according to claim 1 in which said contacting is carried out at a temperature from about $-20°$ to $+100°$ F. and a pressure from about 100 to 1500 p.s.i.g.

9. A process of removing water and acid gas from the group consisting of carbon dioxide and hydrogen sulfide from admixture with gaseous $C_1$–$C_3$ alkane hydrocarbons which comprises contacting said gaseous admixture in a first contacting zone with a mixture of a first liquid solvent, consisting essentially of at least one low-molecular-weight cyano-substituted ester of the formula

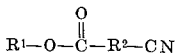

wherein $R^1$ is a lower alkyl radical and $R^2$ is a lower alkylene radical, and a second higher boiling liquid solvent being adapted to absorb moisture and said first solvent; separately withdrawing a liquid stream of said second solvent and a gaseous stream comprising vaporized first solvent and unabsorbed components of said admixture fed to said first contacting zone from said first contacting zone; passing said gaseous stream through a cooling zone whereby part of said gaseous stream is condensed; separately withdrawing condensate and uncondensed components of said gaseous stream from said first cooling zone; combining said condensate with said liquid stream from said first contacting zone, and separating absorbed water and second solvent from the combined solution; contacting the uncondensed components of said gaseous stream in a second contacting zone with said first solvent, under conditions resulting in partial vaporization of said first solvent and absorption of said acid gas in the unvaporized first solvent; separately withdrawing a liquid stream of spent first solvent and a gaseous stream from said second contacting zone; contacting the gaseous stream from said second contacting zone in a third contacting zone with said second solvent, under conditions resulting in absorption of vaporized first solvent and water; separately withdrawing from said third contacting zone the unabsorbed components of the gaseous stream from said second contacting zone and said second solvent containing absorbed first solvent and water; recycling said second solvent from said third contacting zone to said first contacting zone; and separating the absorbed acid gas from said spent first solvent.

10. A process according to claim 9 in which the radicals $R^1$ and $R^2$ contain a maximum total of five carbon atoms, and the radical $R^2$ contains a maximum of two carbon atoms.

11. A process according to claim 10 in which said first solvent is methyl cyanoacetate and in which the uncondensed components of said gaseous stream are passed through said second contacting zone at superatmospheric pressure in countercurrent contact with said first solvent, the pressure of said spent first solvent is reduced in a desorbing zone to flash off acid gas, and the acid gas separated from said spent first solvent in said desorbing zone is contacted with said second solvent in a fourth contacting zone whereby entrained vaporized first solvent is absorbed.

12. A process of removing an acid gas selected from the group consisting of carbon dioxide and hydrogen sulfide from admixture with gaseous $C_1$–$C_3$ alkane hydrocarbons which comprises contacting the gaseous admixture with about 5 to 150 gallons of a solvent per Mc.f. of the gaseous admixture measured at 14.7 p.s.i.a. and 60° F., said solvent consisting essentially of at least one low-molecular-weight cyano-substituted ester of the formula

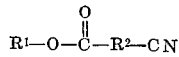

wherein $R^1$ is a lower alkyl radical, $R^2$ is a $C_1$–$C_2$ alkylene radical and the radicals $R^1$ and $R^2$ contain a maximum total of five carbon atoms, at a temperature of about −20° to +100° F. and a pressure of about 100 to 1500 p.s.i.g., and separating the unabsorbed components of the gaseous admixture from said solvent.

References Cited by the Examiner

UNITED STATES PATENTS

| | | | |
|---|---|---|---|
| 2,139,375 | 12/1938 | Millar et al. | 55—73 |
| 2,486,778 | 11/1949 | Doumani | 23—2 |
| 2,668,748 | 2/1954 | Asbury | 23—150 X |
| 2,781,863 | 2/1957 | Bloch et al. | 55—73 X |
| 2,863,527 | 12/1958 | Herbert et al. | |
| 2,926,751 | 3/1960 | Kohl et al. | 55—68 X |
| 3,097,917 | 7/1963 | Dotts et al. | 55—73 X |

FOREIGN PATENTS

| | | |
|---|---|---|
| 596,692 | 4/1960 | Canada. |
| 596,693 | 4/1960 | Canada. |
| 728,444 | 4/1955 | Great Britain. |
| 750,399 | 6/1956 | Great Britain. |

REUBEN FRIEDMAN, *Primary Examiner.*